US011010999B2

(12) United States Patent
Cate et al.

(10) Patent No.: US 11,010,999 B2
(45) Date of Patent: May 18, 2021

(54) SYSTEMS AND METHODS FOR VOICE-ACTIVATED CONTROL OF AN ACCESS CONTROL PLATFORM

(71) Applicant: The Chamberlain Group, Inc., Oak Brook, IL (US)

(72) Inventors: Casparus Cate, Chicago, IL (US); James J. Fitzgibbon, Batavia, IL (US); Martin B. Heckmann, Woodridge, IL (US); James D. Johnson, Algonquin, IL (US); David R. Morris, Glenview, IL (US); Cory Sorice, LaGrange, IL (US)

(73) Assignee: The Chamberlain Group, Inc., Oak Brook, IL (US)

(*) Notice: Subject to any disclaimer, the term of this patent is extended or adjusted under 35 U.S.C. 154(b) by 88 days.

(21) Appl. No.: 16/381,779

(22) Filed: Apr. 11, 2019

(65) Prior Publication Data
US 2019/0318562 A1  Oct. 17, 2019

Related U.S. Application Data

(60) Provisional application No. 62/658,375, filed on Apr. 16, 2018.

(51) Int. Cl.
*G07C 9/00* (2020.01)
*G10L 15/22* (2006.01)
*G06F 9/451* (2018.01)

(52) U.S. Cl.
CPC ......... *G07C 9/00563* (2013.01); *G06F 9/451* (2018.02); *G10L 15/22* (2013.01); *G10L 2015/223* (2013.01)

(58) Field of Classification Search
CPC ............... G10L 17/24; G07C 9/00563
(Continued)

(56) References Cited

U.S. PATENT DOCUMENTS 7,552,467 B2 * 6/2009 Lindsay .................. G06F 21/31
726/5
8,756,650 B2    6/2014 Wolfson
(Continued)

FOREIGN PATENT DOCUMENTS

CN         101494540         7/2009

OTHER PUBLICATIONS

International Search Report and Written Opinion dated Jul. 28, 2019 for PCT Patent Application No. PCT/US2019/27469, 11 pages.
(Continued)

*Primary Examiner* — Susan I McFadden
(74) *Attorney, Agent, or Firm* — Fitch, Even, Tabin & Flannery LLP (57) ABSTRACT

The systems and methods provided herein use a rolling voice identifier in a multi-factor authentication system to avoid the security problems present in prior voice activated control systems. By implementing a rolling voice identifier in an access control platform, users may no longer need to be concerned with being overheard or recorded when providing voice authentication commands to an access control platform because the rolling voice identifier that the user will be prompted to speak will be specific to the particular instance of control of an access control platform. An access control platform is a platform that controls operation of a movable barrier by, for example, controlling the state of a movable barrier using a remote control. An access control platform may cause a movable barrier to become opened, closed, locked, or unlocked to permit or prevent access to a physical space by a physical object.

24 Claims, 6 Drawing Sheets

(58) Field of Classification Search
USPC .......................................................... 704/275
See application file for complete search history.

(56) References Cited

U.S. PATENT DOCUMENTS

| | | | |
|---|---|---|---|
| 9,879,466 B1 | 1/2018 | Yu | |
| 9,959,694 B2* | 5/2018 | Lindsay | G07F 7/1025 |
| 10,546,583 B2* | 1/2020 | White | G10L 25/84 |
| 10,563,456 B2* | 2/2020 | Bodurka | G05B 19/042 |
| 10,580,043 B2* | 3/2020 | Publicover | H04N 21/2187 |
| 10,580,407 B1* | 3/2020 | Sriram | H04L 12/2803 |
| 10,679,289 B2* | 6/2020 | Weiss | H04L 43/0864 |
| 2007/0055517 A1 | 3/2007 | Spector | |
| 2015/0162006 A1 | 6/2015 | Kummer | |
| 2018/0245395 A1 | 8/2018 | Huggins | |

OTHER PUBLICATIONS

MyQ Garage (Unofficial) by Carrot Studios; https://www.amazon.com/Carrot-Studios-MyQ-Garage-Unofficial/dp/B07DQPJZTW/ref=sr_1_1?s=digital-skills&ie=UTF8&qid=1536762379&sr=1-1&keywords=myq&dpID=51IInV5jIUL&preST=_SY300_QL70_&dpSrc=srch; Sep. 12, 2018; 4 pages.

Nexx Garage, Google Home setup PDF, publicly available as of Apr. 11, 2018 (7 pages).

Youtube video, Open your garage door with google assistant, https://www.youtube.com/watch?v=zLFsYyEw7dQ published Jan. 8, 2018, 35 pages.

* cited by examiner

| Source ID | Installation ID | Voice Data |
|---|---|---|

FIG. 6A

| Source ID | Voice Data |
|---|---|

FIG. 6B

| Installation ID | Voice Data |
|---|---|

FIG. 6C

SYSTEMS AND METHODS FOR VOICE-ACTIVATED CONTROL OF AN ACCESS CONTROL PLATFORM

CROSS-REFERENCE TO RELATED APPLICATION

This application claims the benefit of U.S. Provisional Patent Application No. 62/658,375, filed Apr. 16, 2018, entitled SYSTEMS AND METHODS FOR VOICE-ACTIVATED CONTROL OF AN ACCESS CONTROL PLATFORM, which is incorporated by reference in its entirety herein.

TECHNICAL FIELD

This disclosure relates generally to access control platforms and more specifically to voice-activated access control platforms.

BACKGROUND

Access control platforms are employed to open, close, lock, unlock, and/or otherwise control a state/status of a movable barrier such as a garage door or a door of a house. Some access control platforms move a movable barrier, such as a garage door opener, while other access control platforms secure movable barriers, such as lock of a door. Conventionally, control of some movable barriers such as garage doors and gates are provided by remote controls that employ radio frequencies to transmit control signals. Often, these remote controls are utilized in a vehicle and entail the operator of the vehicle to take her hands off the steering wheel to operate the remote control. A voice-activated control system can eliminate the need to manually actuate the remote control to control the access control platform in order to operate a movable barrier, such as a garage door or control the state a lock of a door to the interior of a house.

However, many traditional access control platforms operated by a remote control, whether by operated voice or actuation of a transmitter's push button, have the same fundamental problem. Specifically, if an unauthorized third party gains possession of or access to the remote control, the third party will be able to operate the access control platform to operate the associated movable barrier.

One prior voice-activated system attempts to solve the problem of unauthorized third-party use of a voice-activated remote control by using a static or single-factor verification method to authenticate a user. For example, a user speaks a command to an access control platform that includes a personal identification number (PIN). However, the use of a PIN is problematic in voice-activated systems for a number of reasons. For example, if a third party is present when you speak PIN, the PIN becomes known to the third party which decreases the security of the access control platform. Similarly, active microphones and other recording devices have become ubiquitous in our society and may be used by a third party to obtain the PIN. Active microphones and other recording devices can be found in our homes, our vehicles, and in our personal telecommunication devices.

In today's connected world where humans interface directly with their electronic devices through voice commands, a more robust user authentication would be useful to secure access control platforms and prevent unwanted intrusion in the home or other secured areas.

DETAILED DESCRIPTION

Systems and methods are provided herein that utilize a rolling voice identifier in a multi-factor authentication system to avoid the security problems present in prior voice activated control systems. By implementing a rolling voice identifier, users no longer need to be concerned with being overheard or recorded when providing voice authentication commands to an access control platform because the rolling voice identifier that the user will be prompted to speak will be specific to the particular instance of control of an access control platform. An access control platform is a platform that controls operation of a movable barrier by, for example, controlling the state of a movable barrier using a remote control. The state of the movable barrier may be, for example, open, closed, locked, unlocked, or combinations thereof. An access control platform may cause a movable barrier to become opened, closed, locked, or unlocked to permit or prevent access to a physical space by a physical object.

In one embodiment, the rolling voice identifier includes a conversational rolling voice identifier. A conversational rolling voice identifier prompts a user to answer questions to which the user may have unique or semi-unique knowledge. As such, security is improved because even in the case where an unwanted third party gains access to the remote control device for controlling the access control point, the third party will be not be able to speak a command and operate the movable barrier because the third-party will almost certainly lack the requisite knowledge to correctly answer the prompt and authenticate the command.

Figure 1:
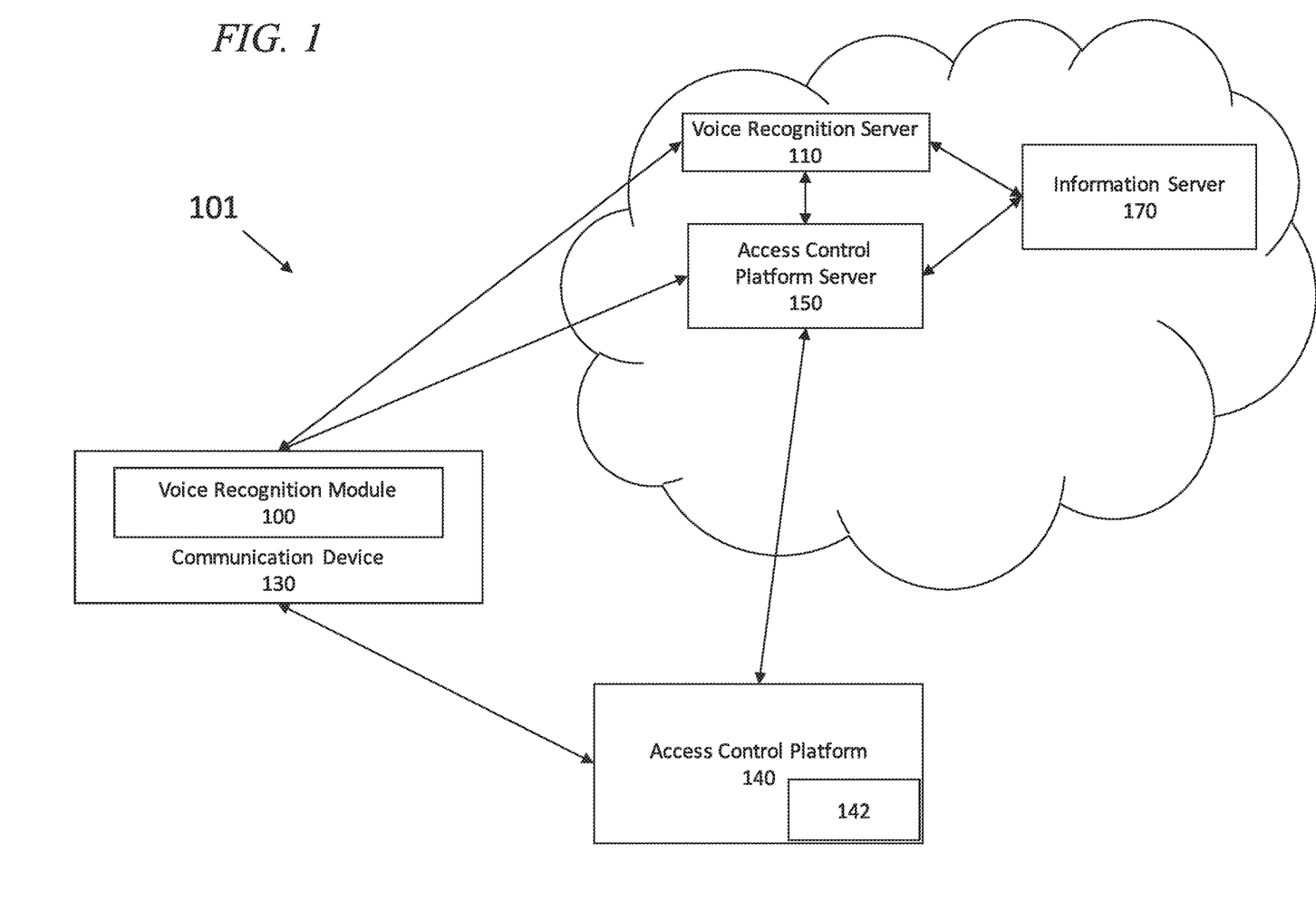
FIG. 1 is a schematic representation of a control system for an access control platform.

With reference to FIG. 1, an example control system 101 is provided for an access control platform 140. The access control platform 140 may be coupled to either or both of a communication device 130 and an access control platform server 150. The access control platform server 150 may be, for example, the MyQ® service provided by the Chamberlain Group, Inc. The access control platform 140 may be comprised of one or more access control devices 142. For example, the access control platform 140 may include one or more movable barrier operators and/or one or more locking mechanisms connected over a communications network such as the Internet. The one or more movable barrier operators are operatively coupled to respective movable barriers. For example, the access control device 142 may include a garage door opener, such as jackshaft or trolley-type garage door opener, connected to a garage door and operable to move the garage door between an open position and a closed position. As another example, the access control device 142 may be a gate operator connected to a swinging gate and operable to move the gate between open and closed positions. As further example, the access control device 142 may include a network-enabled lock mounted to a door, such as a passageway door, in a user's garage.

The access control devices 142 of the access control platform 140 may also be networked to each other in a peer-to-peer ad hoc fashion using a short-range communication protocol such as Bluetooth® (or Bluetooth Low Energy (BLE), or Near Field Communications (NFC), or Wi-Fi) with at least one of the access control devices 142 of the access control platform 140 being able to access a communication network such as the Internet.

The communication device 130 may be any communication device capable of communications over a network such as the Internet. For example, the communication device 130 maybe a mobile telecommunication device such as a personal computer, smartphone device, tablet computer, a network-enabled vehicle, or a smart home device such as a voice/personal assistant including an Amazon® Echo device or a Google® Home device. The communication device 130 may serve as a remote control for the access control platform 150. The communication device 130 may further be capable of communication using, for example, Wi-Fi, cellular network (e.g., 3G, 4G-LTE, 5G new radio (NR)), near-field communication and/or Bluetooth® approaches.

The communication device 130 may have a voice recognition module 100 for processing voice commands of a user. The voice recognition module 100 may perform voice recognition of user voice commands on the communication device 130 or the voice recognition module 100 may send the user voice command to a cloud-based voice recognition service such as voice recognition server 110 for further processing. The functionality of the voice recognition server 110 may also be executed by a module of the access control platform server 150.

Figure 3:
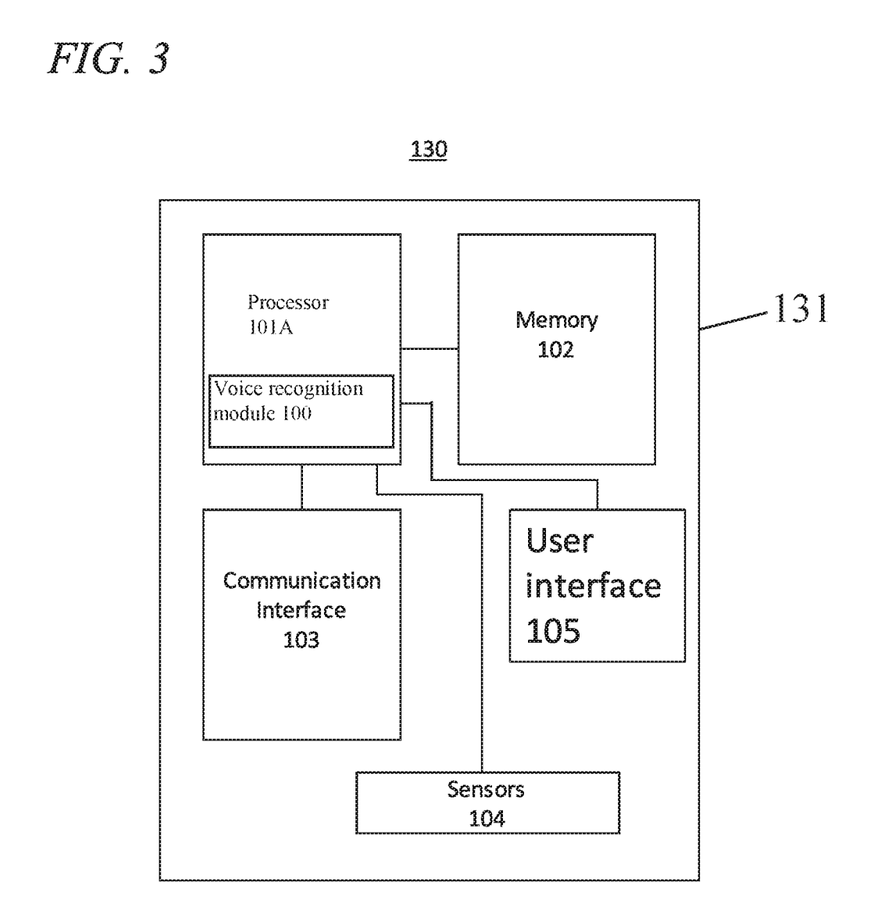
FIG. 3 is a schematic representation of a communication device that may be used in the control systems of FIGS. 1 and 2.

Regarding FIG. 3, the communication device 130 includes a processor 101A in communication with a memory 102, a communication interface 103, one or more sensors 104, and a user interface 105 which may include one or more microphones. The processor 101A may operate the voice recognition module 100 that processes voice data from the one or more microphones of the user interface 105. One or more of the processor 101A, the memory 102, communication interface 103, sensors 104, and user interface 105 may be within or a component of a housing 131 of the communication device 130.

The user interface 105 may include a passive or active microphone device for receiving voice commands from a user. In case of a passive microphone device, the user may initiate a voice command by first manipulating the communication device 130 to cause it to enter a mode in which voice commands may be received from a user. For example, the user may press a physical or capacitive button, an icon, or graphical user interface element displayed on a screen of the user interface 105 of the communication device 130. In the case of an active microphone, the communication device 130 may be caused to enter a mode for receiving voice commands by the user first vocalizing a keyword prior to the command. For example, a user may say "Alexa, open my garage door." In this example, "Alexa" is the keyword and "open my garage door" is the command.

With reference to FIG. 1, after the voice recognition module 100 receives the voice command spoken by the user from a passive or active microphone device of the communication device 130, the voice recognition module 100 transmits the voice command to the voice recognition server 110 to determine a recognized voice command. Additionally, or alternatively, the communication device 130, by the voice recognition module 100, may transmit an installation identification (ID) along with the voice command to the voice recognition server 110. The installation ID uniquely identifies one or more of a particular installation of a software, a device, or a user account using any or all of a device ID, software installation ID, and an account ID. For example, if a voice recognition module, such as voice recognition module 100, is installed on a device, such as communication device 130, the software installation ID will uniquely identify the particular instance of the software installed on the communication device 130 to a voice recognition server such as voice recognition server 110. A device ID, on the other hand, uniquely identifies the particular device on which the particular instance of the software is installed. Further, an account ID uniquely identifies a user account logged into the particular instance of the software installed on the device or otherwise running on the device.

Figure 6A:
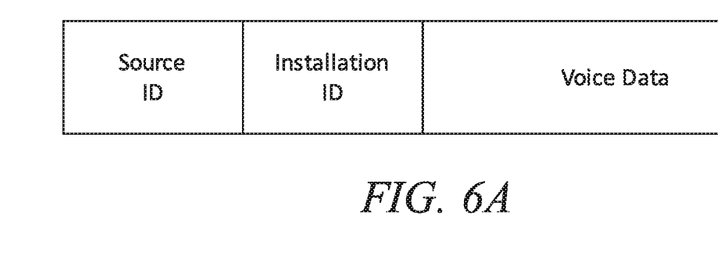
FIGS. 6A, 6B, 6C are examples of packet structures for communicating voice data to an access control platform server that may be used with the control systems of FIGS. 1 and 2.
Figure 6B:
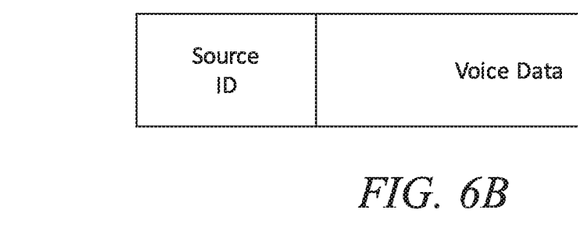
Figure 6C:
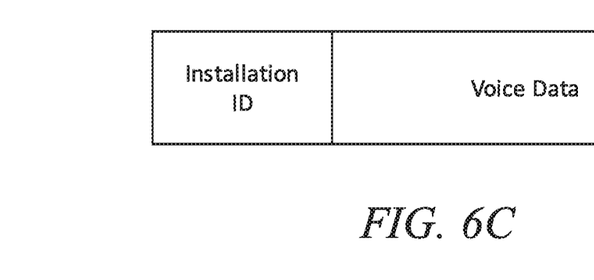

The installation ID may be encoded into the voice command for decoding by the voice recognition server 110 or it may be appended to the voice command as a header as illustrated in FIG. 6C. Similarly, the installation ID may simply be included in the data payload of a packet along with the voice command. In the case that the installation ID is transmitted as header, the information included in the header is not limited to only the installation ID, however, in this case the header will not include the voice command.

Additionally or alternatively, the communication device 130, by the voice recognition module 100, may transmit a source ID along with the voice command to the voice recognition server 110. The source ID may include information regarding the environment surrounding the communication device 130, the communication device 130 itself, or a user or users engaging with the communication device 130. For example, the communication device 130 may receive the information regarding the environment surrounding the communication device 130 from one or more sensors 104 (FIG. 3). The sensors 104 may be either integral to the communication device 130 or coupled thereto by wired or wireless approaches. The sensors 104 may provide environmental data such as light level, ambient sound level, humidity, temperature, or a number of persons in the vicinity of the communication device. The sensors 104 may include any or all of light sensors such as photo-emissive cells, photo-conductive cells, photovoltaic cells, and photo-junction devices; acoustic sensors such as microphones; humidity sensors; temperature sensors; and images sensors such as CMOS image sensors.

The communication device 130 may also determine information regarding the state of the communication device 130 to be included in the source ID. For example, the communication device 130 may receive information regarding the state of the communication device 130 from one or more sensors 104. The sensors 104 may be either integral to the communication device 130 or coupled thereto by a wired or wireless means. The sensors 104 may provide data regarding the state of the communication device 130 such as such as speed, velocity, orientation, or acceleration. The sensors 104 may include, for example, gyroscopes, magnetometers, or accelerometers. Furthermore, the sensors 104 be configured to receive information from a global positioning system (GPS) and/or cellphone towers and determine information regarding the state of the communication device 130 such as position, speed, velocity, orientation, or acceleration. As one example, the communication device 130 may determine the location of the communication device 130 and provide the location information to the access control platform server 150. As another example, the communication device 130 may provide location information to the access control platform server 150 and the access control platform server 150 determines the location of the communication device 130.

The communication device 130 may also determine information regarding a user or users engaged with the communication device 130. For example, the communication device 130 may determine a number of persons in the area in or surrounding the communication device 130 based on the number of unique voices detected and the volume of the voices. Alternatively, the sensors 104 of the communication device 130 may include image sensors and the communication device 130 performs face detection to determine a number of people in or surrounding the communication device 130.

The source ID may be encoded into the voice command for decoding by the voice recognition server 110 or it may be appended to the voice command as a header as illustrated in FIG. 6B. In the case that the source ID is transmitted as a header, the information included in the header is not limited to only the source ID, however, in this case the header will not include the voice command. The communication device 130 may transmit, by the voice recognition module 100, both the installation ID and the source ID as illustrated in FIG. 6A. The source ID and the installation ID may be combined in a single header or separated in different headers.

Regarding FIG. 1, the voice recognition server 110 may be further coupled to the access control platform server 150 and an information server 170. After the voice recognition server 110 determines a recognized voice command, the voice recognition server 110 may send the recognized voice command to the access control platform server 150 for further processing.

The voice recognition server 110 may employ either user-dependent or user-independent voice recognition technology. In the case of a user-independent voice recognition technology, the output of the voice recognition server is simply a recognized voice command. For example, if the user of the communication device 130 issues a voice command to open a garage door to the access control platform 140, the output of the voice recognition server 110 may only be the recognized voice command. Alternatively or in addition to outputting the recognized voice command, the voice recognition server 110 may send any or all of the source ID, the installation ID, and the account ID to the information server 170. The information server 170 may determine particular information about the communication device 130 or the user account and provide the determined information to the access control platform server 150.

In the case of user-dependent voice recognition, the voice recognition server 110 may use one or more user-dependent speech variables to determine the identity of the user who issued the voice command. For example, user-dependent speech variables may include grammar, accent, and/or cadence in addition to combinations thereof, and the voice recognition server 110 may determine a grammar, accent, and/or cadence of a received voice command and compare the determined grammar, accent, and/or cadence to a particular known grammar, accent, and/or cadence of users associated with the installation ID. For example, a home owner may be a user associated with the installation ID and the voice recognition server 110 may first determine if a user who issued a command to the communication device 130 is the home owner.

If the speaker is determined not to be a user associated with the installation ID, the voice recognition server 110 may use information associated with the installation ID on the information server 170 to determine if the user that issued the voice command is causally or socially linked to the installation ID. For example, if a delivery associate arrives at a home to deliver a package and the delivery associate issues a voice command such as "Alexa, open the garage door" to the delivery associate's communication device 130, the voice recognition server 110 may determine that the delivery associate is not a user associated with the installation ID and then poll the information server 170 to determine information about the users associated with the installation ID. The voice recognition server 110 may then determine that the user associated with the installation ID is expecting to have a package delivered and determine a known list of delivery associates that are associated with, for example, a location associated with the installation ID. The voice recognition server 110 may then compare the user-dependent speech variables determined from the issued voice command to stored user-dependent voice variables associated with the determined list of delivery associates to determine the identity of the user who issued the voice command. Alternatively, the information server 170 may have prior knowledge that a particular delivery person has been granted permission to operate the access control platform 140 (e.g. a garage door opener) using a voice command and the voice recognition server 110 may compare the user-dependent speech variables determined from the issued voice command to the stored user-dependent speech variables of the particular delivery associate to determine if there is a match before the voice recognition server 110 compares the determined user-dependent speech variables to a larger list of potential delivery drivers.

The voice recognition server 110 may send any or all of the recognized command, the identity of the recognized issuer of the voice command, the source ID, the installation ID, information associated with the recognized issuer of the voice command, information associated with the installation ID, and information associated with the source ID to the access control platform server 150.

After the access control platform server 150 receives any or all of the aforementioned information, the access platform control service 150 proceeds to authenticate the voice command to avoid control of the access control platform 140 by unwanted third-parties. The access control platform server 150 may use a rolling voice identifier to authenticate the recognized voice command. Furthermore, the access control platform server 150 may determine a level of authentication needed for a particular command. For example, if a user issues the command "Alexa, close my garage door" the level of authentication needed before the access control platform server 150 may be low since the closing of a garage door presents less risk of intrusion into the physical space controlled by the access control platform 140 than if a user were to issue a command such as "Alexa, open my garage door." In the latter case, failure to authenticate the user adequately increases the security risk to the objects and people occupying the physical space controlled by the access control platform 140.

To increase the level of authentication, the access control platform server 150 may specify the use of a rolling voice identifier. The access control platform server 150 may send a randomly or pseudo-randomly generated passphrase to the communication device 130. The randomly generated passphrase may consist of a random number, pseudo-random number, or a set number of syllables or words. Alternatively, the access control platform server 150 may randomly or pseudo-randomly generate a passphrase from a predetermined group of syllables or words that are optimized to create a sufficient amount of a differentiability for the purposes of determining who is speaking. Additionally or alternatively, the access control platform server 150 may randomly or pseudo-randomly generate a passphrase from a predetermined group of syllables or words that are optimized to create a sufficient amount of differentiability for the purpose of determining who is speaking while taking into account the ease of pronunciation for a user.

Figure 2:
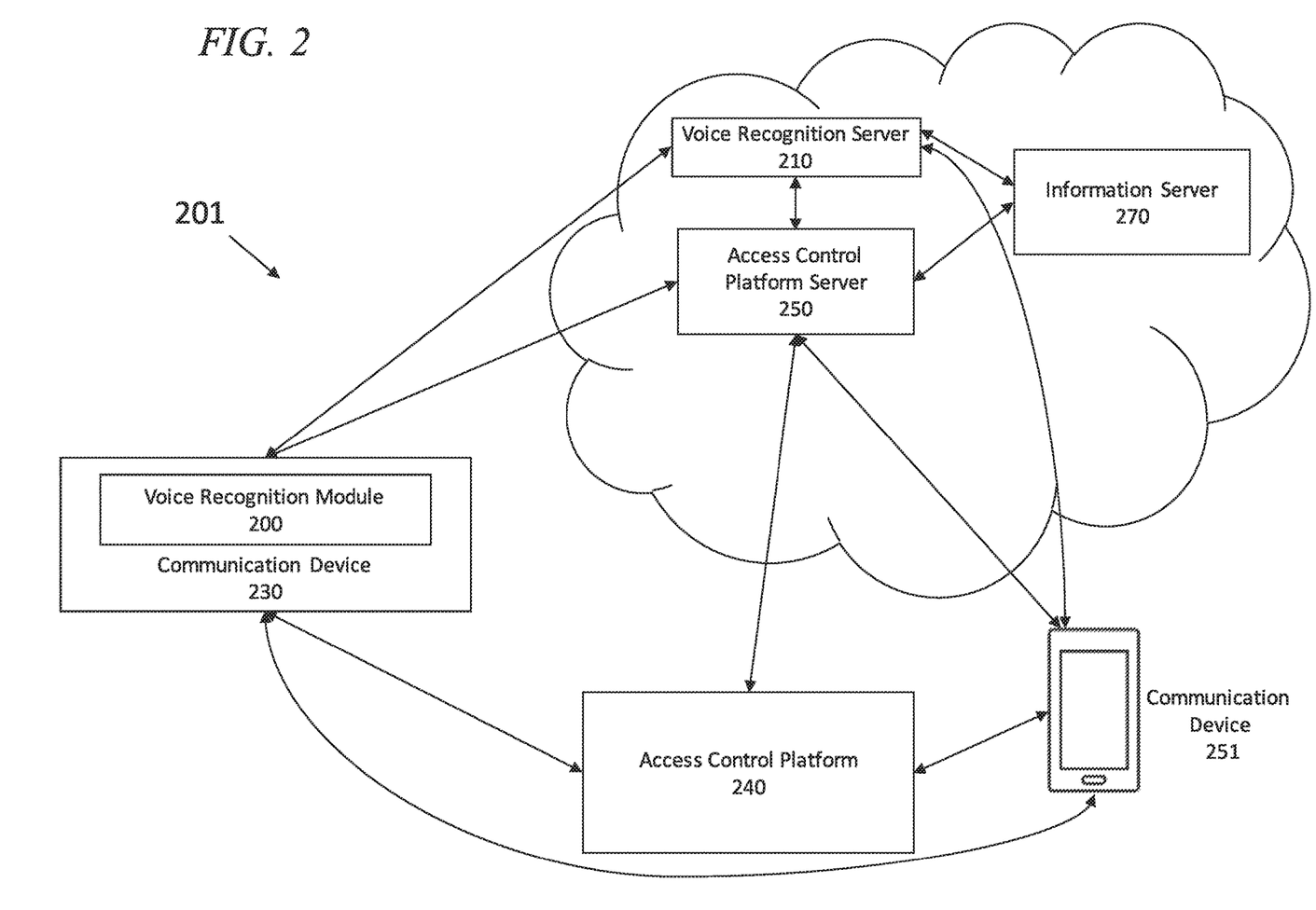
FIG. 2 is a schematic representation of an authorized-user-in-the-loop control system for an access control platform.

The communication device 130 and/or the communication device 230 may provide a physical stimulus in a user's environment as part of the soliciting of a voice identifier from a user. For example, the communication device 130 and/or the communication device 230 may cause a physical stimulus using one or more of a speaker, a display, a haptic/vibrating mechanism such as a piezoelectric device or a linear or non-linear oscillator, an LED indicator, or an indicator array able to emit light of various colors. For example, the physical stimulus may include the passphrases or identifiers described above. In another example, the physical stimulus is the color light emitted from the communication device 130, 230. The communication devices 130 and 230 may also cause other devices in the user's environment to generate a physical stimulus.

In one form, the communication device 230 is an Amazon Echo® and includes a light ring that changes color. The user speaking into the communication device 130 must state the current color of the light ring, e.g., blue or red, as part of the authentication process. The light ring color may change each time a voice command is provided to the communication device 130. Further, the control system 101 may permit only a hub (Amazon Echo®) to control the access control platform 140 and not permit secondary devices (e.g., an Amazon Echo Dot®) to control the access control platform 140.

For example, the access control platform server 150 may store a predetermined set of a syllables and words each having a weight S corresponding a reliability of the word or syllable to be detected by voice recognition algorithm for uniquely identifying a speaker. The access control platform server 150 may randomly or pseudo-randomly combine the syllables such that the resulting passphrase has a summed weight value $S_{sum}$ that is greater than a predetermined usability threshold. In one embodiment, $S_{sum}$ is determined by equation (1) below:

$$S_{sum} = \sum_{i=1}^{n} S_i$$

In equation (1) above, n represents the number of words or syllables in the passphrase and $S_i$ is the individual weight for each of the words or syllables. It should be noted that a passphrase may include both randomly or pseudo-randomly generated words and randomly or pseudo-randomly generated syllables.

In the case where the access control platform server 150 considers the ease of pronounceability of a given passphrase, the access control platform server 150 may also store a pronounceability score P for the predetermined words or syllables. The overall pronounceability of the passphrase $P_{sum}$ may be determined by equation (2) below.

$$P_{sum} = \sum_{i=1}^{n} P_i$$

In equation (2) above, n represents the number of words or syllables in the passphrase and $P_i$ is the individual pronounceability score for each of the words or syllables.

In the case where the access control platform server 150 considers the pronounceability of the randomly or pseudo-randomly generated passphrase, a usability score C of the randomly or pseudo randomly passphrase must exceed the predetermined usability threshold value to be considered usable as a passphrase. The usability score may be determined by equation (3) below.

$$C = S_{sum} * P_{sum}$$

Equation (3) may be further modified to account for known difficulties in pronunciation in consecutive ones of the randomly selected words or syllables. In such a case, the access control platform server 150 may determine assign a difficulty score D based on adjacent words or syllables. The difficulty score may be determined by equation (5) below.

$$D_{sum} = \sum_{i=1}^{g} D_i$$

In equation (5) above, g represents the number of pairs of consecutive words or syllables in the passphrase and $D_i$ is the individual difficulty score for each of the pairs of consecutive words or syllables. The usability C score of a passphrase may be calculated according to equation (6) below.

$$C = D_{sum} * S_{sum} * P_{sum}$$

It should be noted, the determination of the passphrase could also be performed on the voice recognition server 110, in any manner described above, and the voice recognition server 110 may send the passphrase to access control platform server 150 for further processing, directly to the communication device 130 for output to the user, or both. For example, after determining the voice command, the voice recognition server 110 may send the voice command to the access control platform server 140 and the access control platform server 150 may reply to the voice recognition server 110 requesting that the voice recognition system generate a passphrase.

The rolling voice identifier improves security of voice-controlled systems by creating a passphrase that is sufficiently differentiable for the purposes of voice recognition while yet being randomly generated. This prevents sound-alikes or other unwanted third-party users from, for example, overhearing or recording a passphrase and subsequently using the passphrase to open a garage door via the access control platform 150. An authorized user need not fear that an unwanted third-party will over-hear, record, or otherwise imitate a passphrase voiced by the authorized user because the passphrase is both generated to user-dependent voice recognition and is random or pseudo-randomly generated. Furthermore, the rolling voice identifier may be generated such that pronounceability and difficulty of the phrase are considered making it yet easier for users to enter a passphrase.

Figure 4:
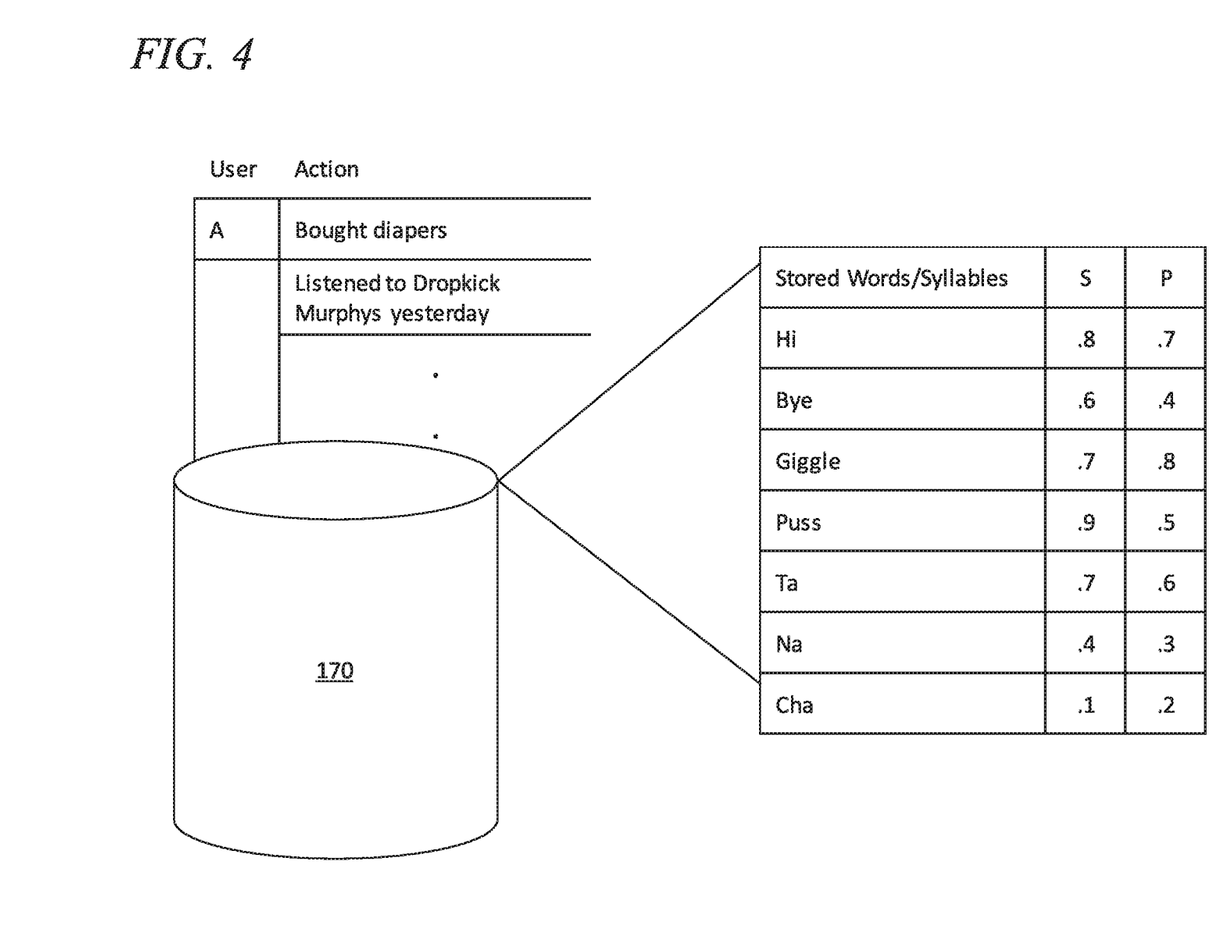
FIG. 4 is a schematic representation of an information server that may be used with the control systems of FIGS. 1 and 2.
Figure 5:
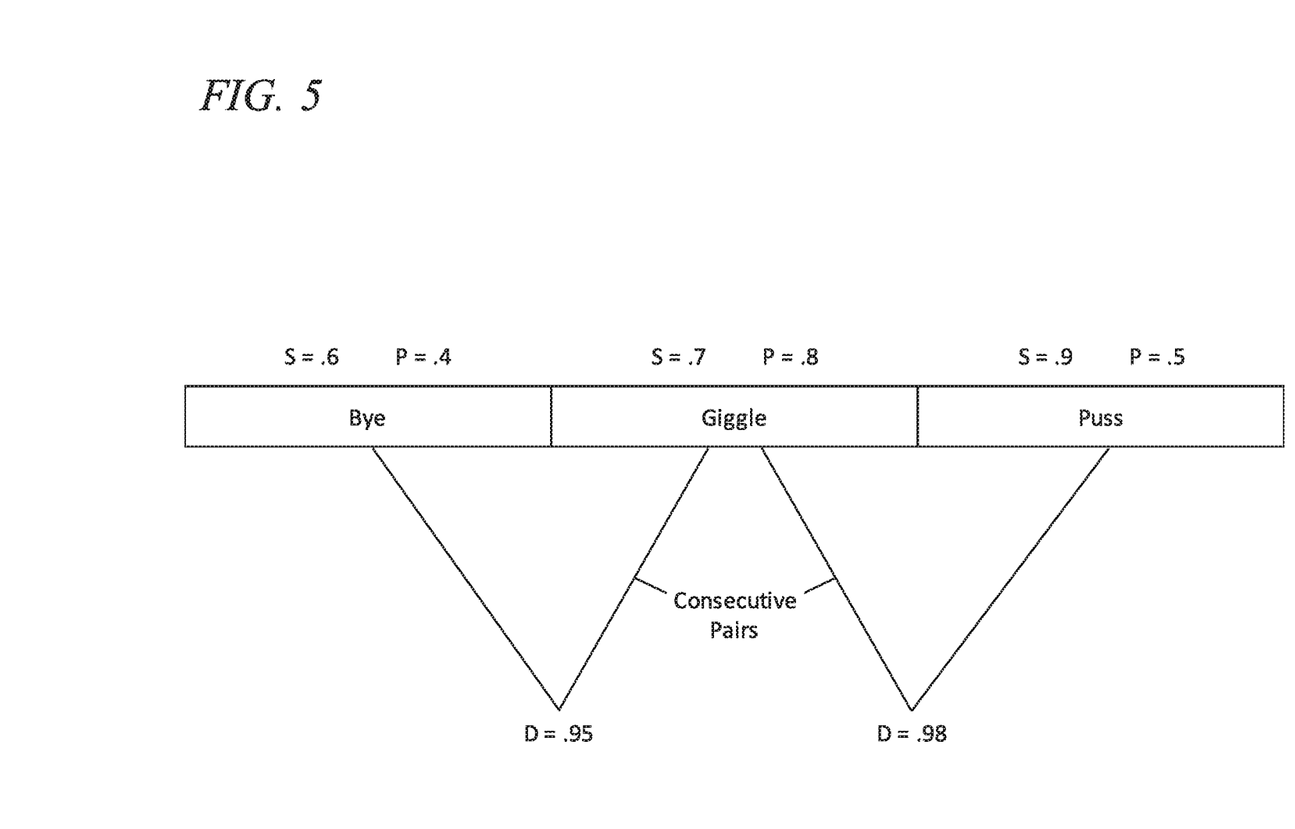
FIG. 5 is an example of a rolling voice identifier.

FIG. 5 illustrates an example passphrase generated as a rolling voice identifier and associated with P, S, and D values. Similarly, FIG. 4 illustrates an example of the information server 170 storing predetermined words and syllables as well as information about individual users.

After either the voice recognition server 110 or the access control platform server 150 generates the passphrase, the passphrase may be sent to the communication device 130 and the communication device 130 provides an audio or visual prompt for the user to speak the passphrase. For example, the communication device 130 may include a speaker, a screen, a projector, a light, a laser, and/or combinations thereof to prompt the user to speak the passphrase.

After the user speaks the passphrase to the communication device 130, the communication device 130 may send to passphrase back to either the voice recognition server 110 or the access control platform server 150 where it will be determined whether an authorized user spoke the passphrase and whether the passphrase spoken was correct.

If either the voice recognition server 110 or the access control platform server 150 determines that the correct passphrase was spoken by an authorized user, the access control platform server 150 will communicate the recognized voice command to the access control platform 140 to control the access control platform 140. For example, if the access control platform 150 determines that the correct passphrase was spoken by an authorized user who issued a voice command to open a garage door, the access control platform 140 will open the garage door based on the recognized voice command.

For a conversational rolling voice identifier, the access control platform server 150 may communicate with either or both of the voice recognition server 110 and the information server 170 to randomly generate an authentication question based on information about the user of the communication device 130 stored in the information service 170. For example, the information server 170 may store information about the users such a recent purchase or favorite playlists as shown in FIG. 4. Additionally, the information server 170 may store a list of words and/or phrases entered by a user. Such words and/or phrases may be secret or semi-secret such that these words and/or phrases are known only to the user or other residents or secondary users. Based on the information stored in the information server 170, the access control platform server 150 or the voice recognition server 110 may generate the authentication question and send the authentication question to the communication device 130. Upon receipt of the authentication question by the communication device 130, the user of the communication device 130 may be prompted, by a speaker or display of the user interface 105 of the communication device 130, to respond with the answer to the authentication question. The user interface 105 may be, in one form, the center stack or infotainment system of a vehicle.

In the case of the user being prompted by the speaker of the user interface 105, the authentication question will be output from the speaker of the communication device 130 as audio. In the case of a display, the question may be displayed, for example, as human-readable text or an image on a display of the user interface 105. In either case, after communication device 130 outputs the authentication question to the user, the communication device 130 will turn on a microphone of the user interface 105 and wait for a response to the authentication question. The voice recognition module 100 receives the user's response to the authentication question from the microphone of the communication device 130 and the communication device 130 transmits the user's response to the voice recognition server 110 for further processing.

After the voice recognition server 110 receives the response to the authentication question from the communication device 130, the voice recognition server 110 processes the response to determine a recognized response to the authentication question. Then, the voice recognition server 110 may send the recognized response to the authentication question to the access control platform server 150. After receiving the recognized response to the authentication question, the access control platform server 150 may determine whether the recognized response to the authentication question matches the information about the user from which the authentication question was generated. If the access platform control server 150 determines that the recognized response to the authentication question matches the information, the access platform control server 150 may send the recognized command to the access control platform 140 to cause the access control platform 140 to permit or prevent operation of the associated movable barrier. For example, upon receiving the recognized command from the access control platform server 150, the access control platform 140 may open, close, lock or unlock a movable barrier to permit or prevent access beyond the movable barrier by a physical object. The voice identifier may be encrypted or encoded such as by using the installation ID.

Additionally or alternatively, the access control platform server 150 may determine the level of authentication needed before the access control platform server 150 may cause the access control platform 140 to control the state of one or more movable barriers. For example, if an authorized user of the access control platform server 150 is in the vicinity of the access control platform 140, the level of authentication of an unknown or previously unauthorized user may be lower. The location of an authorized user may be determined by, for example, geofencing or determining whether a device known to be associated with the authorized user is connected to the communication device 130 via a wired or wireless connection.

Alternatively or additionally, control of the access control platform 140 by the communication device 130 may be disabled if the communication device 130 determines that the authorized user is in the vicinity of the communication device 130 or the access control platform 140. As an example, if an authorized user is at home with the communication device 130, the control system 101 will not open the garage door to be opened by a third party unless the authorized user (or another authorized user) speaks an open command to the communication device 130.

FIG. 2 illustrates an example of an authorized-user-in-the-loop control system 201 for an access control platform as opposed to the control system 101 of FIG. 1 in which an authorized user is not involved in authenticating a voice command received at the communication device 130. The control system 201 differs from the control system 101 at least in that the control system 201 includes a communication device 251 belonging to an authorized user of the access control platform 240. The communication device 251 provides increased security in some instances for the access control platform 240.

The communication device 251 may be coupled to any or all of the communication device 230, an access control platform server 250, and an access control platform 240. The communication device 251 may be coupled to the access control platform server 250 by, for example, the Internet. The communication device 251 may also connect to the communication device 230 via a communication network such as the Internet, however, the communication device 251 may also connected to the access control platform 240 and the communication device 230 directly by using, for example, a short range wireless communication protocol such as Bluetooth®. Additionally, the communication device 251 may be connected to the communication device 230 via a wired connection.

The control system of FIG. 2 may perform any of the functions described with respect to FIG. 1 in the same or a substantially similar manner. For example, the access control platform server 250 may send a random or pseudo-random passphrase to the communication device 251 that is to be spoken to the communication device 230.

The communication platform 250 provides an added level of security, for example, in determining whether the access control platform server 250 should grant access to a user of the communication device 230 based on a rolling voice identifier or a conversational rolling voice identifier. More specifically, when a user of the communication device 230 provides a voice command in an attempt to operate the access control platform 240, the access control platform server 250 sends a notification to the communication device 251 to confirm that the user of the communication device 230 should be granted access by the access control platform 240. For example, the access control platform 250 may send a SMS message or other human-readable communication (e.g., email, push notification, etc.) to the communication device 251 containing a one-time use code. The user must speak the one-time use code to the communication device 230 before the access control platform server 250 will permit operation of the access control platform 240 by voice commands at the communication device 230. The one-time use code could be, for example, a date, hour, month the authorized user would know, such as the current time or a date when a particular event occurred.

As another example, the access control platform server 250 may facilitate a video stream from either the communication device 230 or the access control platform 240 in order to display a video of the user of the communication device 230 or the access control platform 240 to the authorized user of communication device 251. For example, the access control platform 240 may include a camera mounted on the outside of a garage and the access control platform 240 may transmit the video from the camera mounted on the outside of the garage to the communication device 251. The video stream may be transferred from either the communication device 230 or the access control platform 240 through the access control platform server 250 to the communication device 251 or directly from either the communication device 230 or the access control platform 240 to the communication device 251. If the authorized user approves of the user at the communication device 230 or the access control platform 240, the authorized user authenticates the user such as by providing a voice command or by pressing a button displayed on a screen of the communication device 251. The access control platform server 250 receives the authentication and permits the user to operate the access control platform 240.

Alternatively or additionally, the access control platform server 250 may send a message to the communication device 251 that will be used to help the access control platform server 250 determine whether to control the access control platform 240 based on a recognized command received from the communication device 230. For example, if the access control platform server 250 determines that it should compare the user-dependent speech variables of the recognized command to stored user-dependent speech variables of delivery associates, then the access control platform server 250 may send an inquiry to the communication device 251 of the authorized user asking whether or not they are expecting a package to be delivered.

As another approach, the communication device 251 could be running an application that causes a speaker of the communication device 251 to create audible or sub-audible chirps from the application that need to be detected by a microphone of the communication device 230 prior to the access control platform server 250 permitting voice commands at the communication device 230 from operating the access control platform 240. This would allow the communication device 251 to interact directly with the communication device 230 rather than having the authorized user act as an intermediary.

Although method steps may be presented and described herein in a sequential fashion, one or more of the steps shown and described may be omitted, repeated, performed concurrently, and/or performed in a different order than the order shown in the figures and/or described herein. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A communication apparatus configured to facilitate operation of a movable barrier operator using voice commands, the communication apparatus comprising:
   a user interface configured to receive a voice command from a user requesting a state change of a movable barrier;
   a communication interface configured to communicate with a server computer, the server computer configured to access user account information; and
   a processor operatively coupled to the user interface and the communication interface, the processor configured to:
      request a first rolling voice identifier from the server computer in response to the user interface receiving the voice command from the user requesting the state change of the movable barrier;
      cause a first physical stimulus to be provided to the user based at least in part on the first rolling voice identifier and the user account information;
      receive, at the user interface, a user voice response to the first physical stimulus; and
      cause a determination of whether to instruct the movable barrier operator to change the state of the movable barrier based at least in part on the user voice response to the first physical stimulus.

2. The communication apparatus of claim 1, wherein the processor is further configured to:
   request, from the server computer, a second rolling voice identifier;
   cause a second physical stimulus to be provided to the user based at least in part on the second rolling voice identifier; and
   cause a determination of whether to instruct the movable barrier operator to change the state of the movable barrier based at least in part on a user voice response to the second physical stimulus.

3. The communication apparatus of claim 2, wherein, in response to receiving the first rolling voice identifier, the processor causes the user interface to provide the first physical stimulus and, in response to receiving the second rolling voice identifier, the processor causes the user interface to provide the second physical stimulus.

4. The communication apparatus of claim 2, wherein the communication interface is configured to communicate with another communication apparatus; and
   wherein, in response to receiving the first rolling voice identifier, the processor causes the user interface to provide the first physical stimulus, and, in response to receiving the second rolling voice identifier, the processor causes the other communication apparatus to provide the second physical stimulus.

5. The communication apparatus of claim 1 wherein the processor is configured to cause the communication interface to communicate location information for the communication apparatus to the server computer in connection with requesting the first rolling voice identifier from the server computer.

6. The communication apparatus of claim 1, wherein the user interface includes a display, a vibrating mechanism, a speaker, and/or a light configured to provide the first physical stimulus.

7. The communication apparatus of claim 1 wherein the user account information includes information regarding one or more purchases associated with a user account.

8. The communication apparatus of claim 1, further comprising a memory configured to store a voice recognition algorithm and the processor is configured to determine an identity of the user based at least in part on the user voice response and the voice recognition algorithm.

9. The communication apparatus of claim 1 wherein the user account information includes information regarding one or more media files associated with a user account.

10. The communication apparatus of claim 1 wherein the first rolling voice identifier includes a conversational rolling voice identifier.

11. A method for a communication apparatus configured to facilitate operation of a movable barrier operator using voice commands, the method comprising:
   receiving, at a user interface of the communication apparatus, a voice command from a user requesting a state change of a movable barrier;
   requesting, via a communication interface of the communication apparatus, a first rolling voice identifier from a server computer in response to the user interface receiving the voice command from the user requesting the state change of the movable barrier, the server computer configured to access user account information;
   causing, by a processor of the communication apparatus, a first physical stimulus to be provided to the user based at least in part on the first rolling voice identifier and the user account information;
   receiving, at the user interface, a user voice response to the first physical stimulus; and
   causing a determination of whether to instruct the movable barrier operator to change the state of the movable barrier based at least in part on the user voice response to the first physical stimulus.

12. The method of claim 11, the method further comprising:
   requesting, from the server computer, a second rolling voice identifier;
   causing, by the processor, a second physical stimulus to be provided to the user based at least in part on the second rolling voice identifier; and
   causing a determination of whether to instruct the movable barrier operator to change the state of the movable barrier based at least in part on a user voice response to the second physical stimulus.

13. The method of claim 12, wherein the method further includes:
   causing, by the processor, the user interface to output the first physical stimulus; and
   causing, by the processor, the user interface to output the second physical stimulus.

14. The method of claim 12, wherein the method further includes:
   causing, by the processor, the user interface to provide the first physical stimulus;
   causing, by the processor, another communication apparatus to provide the second physical stimulus.

15. The method of claim 11 wherein requesting the first rolling voice identifier from the server computer includes providing location information for the communication apparatus to the server computer.

16. The method of claim 11 further comprising, by a processor of the communication apparatus, determining an identity of the user based at least in part on the user voice response and a voice recognition algorithm stored in a memory.

17. The method of claim 11 wherein the first rolling voice identifier includes a conversational rolling voice identifier.

18. A non-transitory computer readable medium having program instructions stored thereon, the program instructions configured to cause a communication apparatus to facilitate operation of a movable barrier operator, the program instructions configured to cause a processor of the communication apparatus to perform the steps of:
   receiving, at a user interface of the communication apparatus, a voice command from a user requesting a state change of a movable barrier;
   requesting, via a communication interface of the communication apparatus, a first rolling voice identifier from a server computer in response to the user interface receiving the voice command from the user requesting the state change of the movable barrier, the server computer configured to access user account information;
   causing a first physical stimulus to be provided to the user based at least in part on the first rolling voice identifier and the user account information;
   receiving, at the user interface, a user voice response to the first physical stimulus; and
   causing a determination of whether to instruct the movable barrier operator to change the state of the movable barrier based at least in part on the user voice response to the first physical stimulus.

19. The non-transitory computer readable medium of claim 18, wherein the program instructions are further configured to cause the processor of the communication apparatus to perform the steps of:
   requesting, from the server computer, a second rolling voice identifier;
   causing a second physical stimulus to be provided to the user based at least in part on the second rolling voice identifier; and
   causing a determination of whether to instruct the movable barrier operator to change the state of the movable barrier based at least in part on a user voice response to the second physical stimulus.

20. The non-transitory computer readable medium of claim 19, wherein the program instructions are further configured to cause the processor of the communication apparatus to perform the steps of:
   causing the user interface to output the first physical stimulus;
   causing the user interface to output the second physical stimulus.

21. The non-transitory computer readable medium of claim 19, wherein the program instructions are further configured to cause the processor of the communication apparatus to perform the steps of:

causing the user interface to provide the first physical stimulus;

causing another communication apparatus to provide the second physical stimulus.

22. The non-transitory computer readable medium of claim 19, wherein the program instructions are further configured to cause the processor of the communication apparatus to perform the steps of:

wherein requesting the first rolling voice identifier from the server computer includes providing location information for the communication apparatus to the server computer.

23. The non-transitory computer readable medium of claim 19, wherein the program instructions are further configured to cause the processor of the communication apparatus to perform the step of:

determining an identity of the user based at least in part on the user voice response and a voice recognition algorithm.

24. The non-transitory computer readable medium of claim 18 wherein the first rolling voice identifier includes a conversational rolling voice identifier.

\* \* \* \* \*